United States Patent [19]

Hickner et al.

[11] Patent Number: 4,758,638

[45] Date of Patent: Jul. 19, 1988

[54] ADVANCED EPOXY RESINS

[75] Inventors: Richard A. Hickner, Lake Jackson; Gwendolyn M. Grays, Sugarland; Kevin A. Owens, Katy, all of Tex.

[73] Assignee: The Dow Chemical Company, Midland, Mich.

[21] Appl. No.: 94,945

[22] Filed: Sep. 9, 1987

Related U.S. Application Data

[63] Continuation-in-part of Ser. No. 887,848, Jul. 18, 1986, abandoned, which is a continuation-in-part of Ser. No. 750,629, Jun. 26, 1985, Pat. No. 4,608,313, which is a continuation-in-part of Ser. No. 640,268, Aug. 13, 1984, abandoned, which is a continuation-in-part of Ser. No. 499,097, May 27, 1983, abandoned, which is a continuation-in-part of Ser. No. 393,969, Jun. 10, 1982, abandoned.

[51] Int. Cl.$^4$ .................... C08G 59/02; C08L 63/00
[52] U.S. Cl. .................................... 525/510; 528/103
[58] Field of Search ................. 528/103; 525/510, 934

[56] References Cited

U.S. PATENT DOCUMENTS

| | | | |
|---|---|---|---|
| 3,336,257 | 8/1967 | Alvey | 528/104 X |
| 3,346,532 | 10/1967 | Greene | 528/104 X |
| 3,350,353 | 10/1967 | Alvey | 528/87 X |
| 3,445,429 | 5/1969 | Sellers | 528/103 X |
| 3,547,881 | 12/1970 | Mueller et al. | 528/87 X |
| 3,634,323 | 1/1972 | Moran | 528/104 X |
| 3,746,545 | 7/1973 | Pollet et al. | 96/66.3 |
| 3,817,918 | 6/1974 | Aufdermarsh, Jr. | 260/47 EP |
| 3,824,212 | 7/1974 | Sinnema et al. | 260/47 EP |
| 4,122,067 | 10/1978 | Anderson | 528/89 |

FOREIGN PATENT DOCUMENTS

| | | |
|---|---|---|
| WO83/04414 | 12/1983 | PCT Int'l Appl. |
| 675171 | 9/1952 | United Kingdom |
| 887996 | 1/1962 | United Kingdom |
| 893912 | 4/1962 | United Kingdom |
| 986204 | 3/1965 | United Kingdom |
| 1398197 | 6/1975 | United Kingdom |
| 1527258 | 10/1978 | United Kingdom |
| 2001324 | 1/1979 | United Kingdom |

*Primary Examiner*—Earl Nielsen

[57] ABSTRACT

Advanced epoxy resins are prepared by reacting an epoxy resin composition containing a mixture of from 6% to less than 50% epoxide equivalents of an aliphatic diepoxide and from greater than 50% to 94% epoxide equivalents of an aromatic diepoxide with a dihydric phenol.

45 Claims, No Drawings

ADVANCED EPOXY RESINS

REFERENCE TO RELATED APPLICATIONS

This is a continuation-in-part of copending application Ser. No. 887,848 filed July 18, 1986 (allowed) which is a continuation-in-part of copending application Ser. No. 750,629 filed June 26, 1985 (now U.S. Pat. No. 4,608,313) which is a continuation-in-part application of copending application Ser. No. 640,268 filed Aug. 13, 1984 (now abandoned) which is a continuation-in-part of copending application Ser. No. 499,097 filed May 27, 1983 (now abandoned) which is a continuation-in-part of copending application Ser. No. 393,969 filed June 10, 1982 (now abandoned).

BACKGROUND OF THE INVENTION

The present invention concerns advanced epoxy resins and coatings containing same.

Coatings have heretofore been prepared by reacting diglycidyl ethers of dihydric phenols with dihydric phenols and subsequently curing same with a suitable curing agent or, for the very high molecular weight advanced products, merely applying a solution of such resin and evaporating the solvent therefrom. While such coatings have good physical and chemical properties, they are somewhat lacking in flexibility and flow. There are some applications such as automotive primer surfacer, automotive stone chip coatings, coil coatings and the like where somewhat reduced physical and/or chemical properties can be accepted for an improvement in flexibility or flow or a reduction in the amount of volatile solvent required to achieve the same application viscosity. Also, because the solution coatings contain solvents which must either be recovered or vented into the atmosphere, the latter of which is not environmentally acceptable, solvent recovery systems are required.

The present invention provides for coatings having improved flexibility and requiring less solvent to achieve desirable application viscosities. The present invention provides coatings having an improvement in flow characteristics and lower melt viscosities as compared to coatings prepared from an advanced epoxy resin prepared from an aromatic diepoxide and a dihydric phenol. The present invention provides coatings having an improvement in solvent resistance, water resistance (moisture sensitivity), corrosion resistance or ability to apply electrodeposition coatings at higher voltages as compared to coatings prepared from an advanced epoxy resin prepared from an aliphatic diepoxide and a dihydric phenol.

SUMMARY OF THE INVENTION

The present invention is directed to an advanced epoxy resin prepared by reacting in the presence of a suitable catalyst
(A) a composition comprising
  (1) at least one aliphatic diepoxide other than a diglycidyl ether of a polyoxyethylene glycol and
  (2) at least one aromatic diepoxide; with
(B) at least one compound having two aromatic hydroxyl groups per molecule and an average molecular weight of at least about 188; wherein
components (A-1) and (A-2) are employed in quantities such that from about 10 to less than about 50 percent of the epoxide equivalents contained in component (A) are contributed by component (A-1); from greater than about 50 to about 90 percent of such epoxide equivalents are contributed by component (A-2) and wherein components (A) and (B) are employed in quantities which provide an epoxy to phenolic hydroxyl ratio of from about 1.06:1 to about 2.9:1, preferably from about 1.07:1 to about 2.9:1, most preferably from about 1.15:1 to about 2.9:1.

Another aspect of the present invention pertains to an advanced epoxy resin prepared by reacting in the presence of a suitable catalyst
(A) a composition comprising
  (1) at least one aliphatic diepoxide other than a diglycidyl ether of a polyoxyethylene glycol and
  (2) at least one aromatic diepoxide; with
(B) at least one compound having two aromatic hydroxyl groups per molecule and an average molecular weight of at least about 188; wherein
components (A-1) and (A-2) are employed in quantities such that from about 6 to about 30 percent of the epoxide equivalents contained in component (A) are contributed by component (A-1); from about 70 to about 94 percent of such epoxide equivalents are contributed by component (A-2) and wherein components (A) and (B) are employed in quantities which provides the resultant advanced epoxy resin with an epoxide equivalent weight of from about 800 to about 3500, preferably from about 800 to about 2000.

The present invention is also directed to powder coating compositions comprising at least one of the aforementioned advanced epoxy resins and a curing quantity of at least one curing agent or curing catalyst therefor.

The present invention is also directed to a coating composition comprising
(I) an advanced epoxy resin prepared by reacting in the presence of a suitable catalyst
  (A) a composition comprising
    (1) at least one aliphatic diepoxide which is free of polyoxyethylene glycol and
    (2) optionally at least one aromatic diepoxide; with
  (B) at least one compound having two aromatic hydroxyl groups per molecule and an average molecular weight of at least about 188; wherein
components (A-1) and (A-2) are employed in quantities such that from about 10 to less than about 50 percent of the epoxide equivalents contained in component (A) are contributed by component (A-1); from greater than about 50 to about 90 percent of such epoxide equivalents are contributed by component (A-2) and wherein components (A) and (B) are employed in quantities which provide an epoxy to phenolic hydroxyl ratio of from about 1.06:1 to about 2.9:1, preferably from about 1.07:1 to about 2.9:1, most preferably from about 1.15:1 to about 2.9:1;
(II) a curing quantity of at least one curing agent for component (I); and
(III) at least one solvent
in a sufficient quantity such that the coating composition including components (I), (II) and (III) and any other desirable components has a suitable application viscosity.

The advanced epoxy resin compositions of the present invention have (a) an increased elongation value when cured with a curing quantity of a suitable curing agent as compared to a similarly cured advanced epoxy resin prepared by reacting the compound having two aromatic hydroxyl groups with an aromatic diepoxide and/or (b) the resultant advanced epoxy resin requires less solvent to reach a desired viscosity value as compared to the quantity of solvent to reach a like viscosity value for a resin prepared from said compound having two aromatic hydroxyl groups and an aromatic diepoxide and/or (c) the advanced epoxy resin compositions have improved flow.

DETAILED DESCRIPTION OF THE PREFERRED EMBODIMENTS

Suitable aliphatic diepoxides which can be employed herein include the diglycidyl ethers of dihydric aliphatic compounds such as, for example, propylene glycol, dipropylene glycol, tripropylene glycol, butylene glycol, dibutylene glycol, tributylene glycol, 1,4-butane diol, 1,6-hexane diol, mixtures thereof and the like.

Also suitable are the glycidyl ethers of polyoxyalkylene glycols having an average molecular weight of from about 200 to about 800, preferably from about 200 to about 400, which polyoxyalkylene glycols are prepared by reacting an aliphatic initiator compound with propylene oxide, butylene oxide or mixtures thereof.

Some of the common methods of synthesis of the aliphatic diepoxides produce significant amounts of organic chloride-containing impurities. However, other processes are known for preparing products with lower levels of such impurities. While the low-chloride resins are not required for the practice of this invention, they can be used, if desired, for possible improvements in the process of preparing the resins, in the storage properties of the resins or formulated coatings made therefrom or in the performance properties of the products.

Suitable aromatic diepoxides which can be employed herein include the diglycidyl ethers of polyhydric phenols such as, for example, catechol, resorcinol, hydroquinone, bisphenol A, mixtures thereof and the like.

Particularly suitable diglycidyl ethers of bisphenols and dihydric phenols which can be employed herein include those mentioned by P. H. Martin in U.S. Pat. No. 3,931,109 which is incorporated herein by reference.

Suitable compounds having two aromatic hydroxyl groups per molecule which can be employed herein include, for example, those represented by the formula

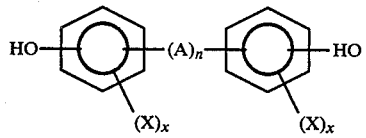

wherein A is a divalent hydrocarbyl group having from 1 to about 10 carbon atoms, —O—, —S—, —S—S—, —SO—, —SO$_2$—, —CO— or —O—CO13 O—; each X is independently a monovalent hydrocarbyl group having from 1 to about 10 carbon atoms or a halogen; n has a value of zero or 1; and x has a value of from zero to 4.

Suitable such phenolic hydroxyl-containing compounds include, for example, bisphenol A, bisphenol K, bisphenol S, tetramethylbisphenol A, tetratertiarybutylbisphenol A, tetrabromobisphenol A, 4,4'-dihydroxybiphenyl, 3,5,3',5'-tetramethyl-4,4'-dihydroxybiphenyl, 3,5,3'5'-tetrabromodihydroxybiphenyl, 3,5,3',5'-tetramethyl-2,6,2',6'tetrabromo-4,4'-dihydroxybiphenyl, mixtures thereof and the like.

It is to be understood, that because of the manner in which the commercial epoxy resins prepared from aliphatic dihydric compounds and aromatic dihydric compounds are prepared, these epoxy resins contain minor amounts of monoglycidyl ether products. However, so long as less than about 10 percent of the epoxy groups are derived from such monoglycidyl ether products, they are suitable. Suitable such commercially available diglycidylethers of aromatic dihydric compounds include D.E.R. TM 330, D.E.R. TM 331, D.E.R. TM 332 and D.E.R. TM 383 commercially available from The Dow Chemical Company as well as EPON TM 825, EPON TM 826 and EPON TM 828 commercially available from Shell Chemical Company.

Suitable commercially available diglycidyl ethers of aliphatic dihydric compounds include D.E.R. TM 732 and D.E.R. TM 736 available from The Dow Chemical Company, and ARALDITE TM RD-2 commercially available from Ciba-Geigy.

The quantities of the aliphatic and aromatic epoxy resins and the compound containing two aromatic hydroxyl groups to be employed are those quantities which will provide the desired average epoxide equivalent weight of the advanced epoxy resin. The percent of aliphatic diepoxide depends upon the particular end use for which the advanced epoxy resin is to be employed.

For example, in automotive primer coatings, the desired percent aliphatic diepoxide is from about 10% to about 30% up to about 40% by weight based upon the combined weight of the aliphatic diepoxide and the aromatic diepoxide and the epoxide equivalent weight of the advanced resin is usually from about 350 to about 700.

For applications as cathodic electrodeposition coatings, the desired percent of aliphatic diepoxide is from about 10% to about <50%, and preferably from about 15% to about 35%, and the epoxide equivalent weight of the advanced resin is from about 1200 to about 3000.

For beverage can coating applications, the desired percent of aliphatic diepoxide is from about 10% to about 25% up to about 40% and the epoxide equivalent weight of the advanced resin is from about 1400 to about 3000.

For coil coating applications, the desired percent of aliphatic diepoxide is from about 10% to 40% up to less than about 50% and the epoxide equivalent weight of the advanced epoxy resin is from about 1400 to about 3000 up to about 5000.

Coatings prepared from resins of the present invention may be applied from solvents or in powder form. Conventional advanced epoxy resins prepared from an aromatic diepoxide and a dihydric phenol and used in powder coatings may be lacking in flexibility or flow. The commercial product most commonly used in powder coatings is a reaction product of the diglycidyl ether of bisphenol A and bisphenol A having an epoxide equivalent weight of about 875 to 975 and a Mettler softening point of about 98°–108° C. Lower molecular weight products will have improved flow but because of the lowered melting points they have a tendency to sinter during storage as well as providing poor flexibility. While higher molecular weight resins will provide powder coatings with increased flexibility the increased melting points will make them difficult to process into powder coatings as well as resulting in poor flow out of the coatings. We have found that replacement of a portion of the diglycidyl ether of bisphenol A by an aliphatic diepoxide in the preparation of the advanced epoxy resin will provide a resin having improved processability and flow while remaining non-sintering. The amount of aliphatic epoxy preferred to be employed will depend on the equivalent weight of the aliphatic epoxy resin employed and the equivalent weight of the resultant advanced resin. Thus, aliphatic epoxy resins having epoxide equivalent weights above about 200 will be particularly effective in improving flow and flexibility at lower levels than aliphatic epoxy resins having epoxide equivalent weights below about 200. Conversely, a greater tendency to sinter will be observed for those resins prepared from aliphatic epoxy resins having epoxide equivalent weights above about 200 as compared to those prepared from aliphatic epoxy resins having epoxide equivalent weights below about 200. It has been observed that resins prepared from a mixture containing from about 6% to about 25% aliphatic epoxy equivalents wherein the aliphatic epoxy resin has an equivalent weight above about 200 and wherein the resultant epoxy resins have epoxide equivalent weights of from about 800 to about 2000 and up to about 3500 exhibit improved flexibility and flow while remaining non-sintering. In contrast, an advanced resin having an epoxide equivalent weight of 1960 prepared by reacting bisphenol A with a mixture of epoxy resins in which up to 50 equivalent percent of the epoxy groups are contributed by the diglycidyl ether of dipropylene glycol, EEW=187, and the remainder by the diglycidyl ether of bisphenol A, EEW=181, will sinter badly. Similarly, an advanced resin having an epoxide equivalent weight of 1720 prepared by reacting bisphenol A with a mixture in which up to 25 equivalent percent of the epoxy groups are contributed by the diglycidyl ether of polyoxypropylene glycol having an average molecular weight of 400 and the remainder contributed by the diglycidyl ether of bisphenol A, EEW=181, will sinter badly.

In contrast, advanced resins having epoxide equivalent weights of about 1800 and in which up to about 44 equivalent percent of the epoxide groups are contributed by 1,4-cyclohexanedimethanol diglycidyl ether, EEW=154, or up to 50 equivalent percent of the epoxide groups are contributed by 1,4-butanediol diglycidyl ether, EEW=124, are non-sintering. In each instance, the remainder of the epoxide equivalents to make up 100 percent of the epoxide groups is contributed by the diglycidyl ether of bisphenol A, EEW=187.

As a general rule, in order to prepare advanced epoxy resins which do not sinter for use in powder coatings from mixtures of aliphatic epoxy resins and aromatic epoxy resins wherein the aliphatic resin has an EEW of <200 and the advanced epoxy resin has an EEW of from about 800 to about 3600, the amount of the aliphatic epoxy resin can be from about 6 to about 30 equivalent percent.

As a general rule, in order to prepare advanced epoxy resins which do not sinter for use in powder coatings from mixtures of aliphatic epoxy resins and aromatic epoxy resins wherein the aliphatic resin has an EEW of <200 and the advanced epoxy resin has an EEW of from about 1200 to about 3600, the amount of the aliphatic epoxy resin can be from about 6 to about 40 equivalent percent.

As a general rule, in order to prepare advanced epoxy resins which do not sinter for use in powder coatings from mixtures of aliphatic epoxy resins and aromatic epoxy resins wherein the aliphatic resin has an EEW of >200 and the advanced epoxy resin has an EEW of from about 800 to about 1200, the amount of the aliphatic epoxy resin can be from about 6 to about 25 equivalent percent.

As a general rule, in order to prepare advanced epoxy resins which do not sinter for use in powder coatings from mixtures of aliphatic epoxy resins and aromatic epoxy resins wherein the aliphatic resin has an EEW of >200 and the advanced epoxy resin has an EEW of from about 1200 to about 3600, the amount of the aliphatic epoxy resin can be from about 6 to about 30 equivalent percent.

Suitable solvents which can be employed herein include, for example, ketones such as acetone, methylethyl ketone, methyl n-amyl ketone, methyl isobutyl ketone; glycol ethers such as, for example, the methyl ether of diethylene glycol, the methyl ether of propylene glycol, the n-butyl ether of ethylene glycol; and esters such as for example, ethyl acetate, butyl acetate and the like.

Suitable solvents also include aromatic compounds, such as, for example, toluene, xylene and the like. It is also understood that mixtures of such solvents can be employed.

Suitable catalysts which can be employed herein in preparing the advanced epoxy resins of the present invention, include any such catalyst suitable for catalyzing the reaction between an epoxy group and a phenolic hydroxyl group. Particularly suitable catalysts include those phosphonium catalysts described by W. O. Perry in U.S. Pat. No. 3,948,855 and Dante et al. in U.S. Pat. No. 3,447,990 which are incorporated herein by reference.

Suitable curing agents which can be employed in the coating compositions of the present invention include, for example, aminoplast resins such as the reaction products of melamine or urea with formaldehyde. Such adducts can be partially or totally etherified with alcohols such as methanol or butanol. Other amino resins would include glycourils, or benzoguanamines. Blocked isocyanates may also be utilized. Typical examples are tolylene diisocyanate, 4,4'-diphenylmethanedisocyanate, a buiret from hexamethylenediisocyanate, a cocyclic trimer of hexamethylenediisocyanate and tolylene diisocyanate blocked with phenols such as phenol, 4-chlorophenol, o-sec-butylphenol, lactams such as caprolactam, and oximes such as acetaldehydeoxime or methylethylketoxime. Also useful are those prepolymers prepared by reacting diols or triols with diisocyanate such as, e.g. tolylene diisocyanate, hexamethylene diisocyanate or isophorone diisocyanate blocked with the aforementioned phenols. Coatings capable of curing at room temperature can be obtained by use of the aforementioned isocyanates which contain no blocking agent.

Suitable curing agents which can be employed to prepare powder coatings from the advanced resins of the present invention include, for example, cyanoguanidines, such as, for example, dicyanamide employed either alone or in combination with accelerators such as tertiary amines, imidazolines, imidazoles or disubstituted ureas. Other curing agents include solid phenolic terminated epoxy resins as described by Martin in U.S. Pat. No. 3,931,109 or phenolic curing agents prepared by reacting a dihydric phenol, a diepoxide and a dicarboxylic acid as described by Schreurs et al in U.S. Pat. No. 4,214,068. Additional curing agents include carboxyl-containing polyesters prepared by reacting an excess of a dicarboxylic or tricarboxylic acid with a polyol such as trimethylolpropane, pentaerythrytol, or diols such as neopentylglycol, 1,4-cyclohexanedimethanol, 1,6-hexanediol, dipropylene glycol or mixtures thereof.

In addition to the above curing agents, the blocked isocyanates mentioned above may be used. The caprolactam blocked isocyanates are particularly useful.

Also suitable are the carboxylic acid anhydrides such as, for example, phthalic anhydride, trimellitic anhydride, mixtures thereof and the like.

The coating compositions of the present invention may also contain, if desired, colorants, dyes, pigments, fillers, leveling agents, mixtures thereof and the like.

The following examples are illustrative of the present invention, but are not to be construed as to limiting the scope thereof in any manner.

The following components were employed in the examples.

ALIPHATIC DIEPOXIDE A was a diglycidyl ether of polyoxypropylene glycol said glycol having an average molecular weight of about 400 and said diglycidyl ether having an epoxide equivalent weight (EEW) of about 311.
ALIPHATIC DIEPOXIDE B was a diglycidyl ether of dipropylene glycol having an EEW of about 195.
ALIPHATIC DIEPOXIDE C was a diglycidyl ether of dipropylene glycol having an EEW of about 176.
ALIPHATIC DIEPOXIDE D was a diglycidyl ether of dipropylene glycol having an EEW of about 184.
AROMATIC DIEPOXIDE A was a diglycidyl ether of bisphenol A having an EEW of about 189.
AROMATIC DIEPOXIDE B was a diglycidyl ether of bisphenol A having an EEW of about 180.
DIHYDRIC PHENOL A was bisphenol A.

EXAMPLE 1

A. Preparation of Advanced Epoxy Resin

A series of advanced epoxy resins were prepared from an aromatic diepoxide with varying quantities of aliphatic diepoxide and bisphenol A (BPA). The catalyst employed was a 70% solution of ethyltriphenyl phosphonium acetate.acetic acid complex in methanol. In each instance, the mixture of epoxy resins and bisphenol A were heated to 70° C. to 90° C. whereupon they formed clear solutions after which the catalyst was added and heating continued to 150° C. whereupon the solution was permitted to exotherm. The solutions were heated for an additional time and temperature. After cooling, the advanced resin was diluted to 85% non-volatiles in toluene. The quantities, reaction conditions and results are given in Table I.

B. Binder Compositions

The advanced resins prepared in A above were blended with a sufficient quantity of a solvent composition consisting of 100 parts by weight (pbw) of methyl ethyl ketone, 100 pbw xylene, 200 pbw toluene and 100 pbw 2-(ethoxy)ethylacetate so as to provide a viscosity employing a No. 2 Zahn cup of 38 seconds.

The % non-volatiles and % total solvent (includes solvent employed during preparation of advanced resin) required to provide the 38 seconds viscosity employing a No. 2 Zahn cup are given in Table I.

C. Preparation of Paints

Binder compositions were made using sufficient quantities of the solutions prepared in (B) above to provide 30 grams of non-volatile resin, 4.5 g of hexamethyoxymelamine, commercially available from American Cyanamid Co. as CYMEL TM 303, 1.5 wt. % of a 40% solution of p-toluenesulfonic acid in isopropanol and an additional 3 g of solvent blend. The binder compositions were then blended with a pigment composition consisting of 7.67 wt. % of ferric oxide, 7.67 wt. % of titanium dioxide, 7.67 wt. % of ASP 400 clay, 75 wt. % of barytes and 2 wt. % of zinc chromate in a ratio of 2 parts of pigment to one part by weight of binder. The binder/pigment blend was placed in a steel cylinder and a volume of steel shot equal to the volume of the binder/pigment blend was added and the cylinder was shaken on paint shaker for 15 minutes (900 s). The contents were filtered to remove the steel shot and the paint aged overnight at 140° F. prior to use.

Films of these paint compositions were applied to polished cold rolled steel panels or unpolished BONDERITE TM 40 panels with a number 22 wire wound Meyer rod. The panels were baked 30 minutes (1800 s) at 325° F. Solvent resistance was determined by rubbing the coating with a 2-pound (0.9 kg) ballpein hammer where the hammer head was covered with gauze and soaked in methyl ethyl ketone. The number of double rubs, a push-pull motion, observed until a marring of the coating occurred was recorded.

The solids content of the paint was determined by heating two grams of the sample at 150° C. in a vacuum oven for 2 hours (7200 s).

The salt spray resistance was carried out in a salt fog cabinet employing the procedure of ASTM B117-73.

This experiment demonstrates that higher solids coatings can be obtained from resins in which a portion of the aromatic diepoxide has been replaced by an aliphatic epoxide.

The results are given in Table I.

TABLE I

| EPOXY RESIN | SAMPLE NUMBER OR LETTER[5] | | | |
|---|---|---|---|---|
| PREPARATION | 1 | 2 | 3 | 4 |
| Aliphatic Resin | | | | |
| Type/pbw[1]/EE[2] | B/40/0.205 | B/80/0.41 | B/120/0.615 | B/200/1.026 |
| % Epoxide Equiv.[4] | 9.67 | 19.5 | 29.34 | 49.23 |
| Aromatic Resin | | | | |
| Type/pbw/EE | A/360/1.915 | A/320/1.693 | A/280/1.481 | A/200/1.058 |
| % Epoxide Equiv. | 90.33 | 80.5 | 70.66 | 50.77 |
| Dihydric Phenol | | | | |
| Type/pbwOHE[3] | A/105.6/0.926 | A/104.2/0.915 | A/101.8/0.893 | A/95.8/0.840 |
| Advanced Resin EEW | 425–430 | 425–430 | 425–430 | 425–430 |
| Catalyst, pbw | 0.4 | 0.4 | 0.4 | 0.4 |
| Exotherm Temp. °C. | 172 | 175 | 175 | 170 |
| Post Heat | | | | |
| Temp., °C. | 175 | 175 | 175 | 170 |
| Time, Hrs./secs. | 1/3600 | 1/3600 | 1/3600 | 1/3600 |

TABLE I-continued

| Binder composition | | | | |
|---|---|---|---|---|
| % non volatiles | 59.7 | 59.4 | 59 | 63.7 |
| % solvent | 40.3 | 40.6 | 40 | 36.3 |
| Paint Composition | | | | |
| MEK Rubs | 37 | 35 | 29 | 25 |
| Salt Spray | | | | |
| in. | 0.0625 | 0.0625–0.9375 | 0.03125–0.0625 | — |
| cm. | 0.15875 | 0.15875–0.238125 | 0.079375–0.0625 | — |

| EPOXY RESIN | SAMPLE NUMBER OR LETTER[5] | | | |
|---|---|---|---|---|
| PREPARATION | 5 | 6 | 7 | A |
| Aliphatic Resin | | | | |
| Type/pbw[1]/EE[2] | A/80/0.257 | A/120/0.386 | A/200.0643 | — |
| % Epoxide Equiv.[4] | 13.18 | 20.67 | 37.8 | 0 |
| Aromatic Resin | | | | |
| Type/pbw/EE | A/320/1.693 | A/280/1.481 | A/200/1.058 | A/400/2.116 |
| % Epoxide Equiv. | 86.82 | 79.33 | 62.2 | 100 |
| Dihydric Phenol | | | | |
| Type/pbwOHE[3] | A/93.6/0.821 | A/89.5/0.785 | A/66.8/0.586 | A/106/0.937 |
| Advanced Resin EEW | 425–430 | 425–430 | 425–430 | 425–430 |
| Catalyst, pbw | 0.4 | 0.4 | 0.4 | 0.4 |
| Exotherm Temp. °C. | 180 | 170 | 160 | 180 |
| Post Heat | | | | |
| Temp., °C. | 175 | 175 | 170 | 175 |
| Time, Hrs./secs. | 1/3600 | 1/3600 | 1/3600 | 1/3600 |
| Binder composition | | | | |
| % non volatiles | 59.3 | 61.3 | 67.1 | 56 |
| % solvent | 40.7 | 38.7 | 32.9 | 44 |
| Paint Composition | | | | |
| MEK Rubs | 15 | 15 | — | — |
| Salt Spray | | | | |
| in. | 0.0625–0.1875 | 0.03125–0.1875 | — | — |
| cm. | 0.15875–0.47625 | 0.079375–0.47625 | — | — |

FOOTNOTES FOR TABLE I
[1]pbw = parts by weight
[2]EE = epoxide equivalents
[3]OHE = hydroxide equivalents
[4]% epoxide equivalents contributed by this resin based upon total epoxide groups.
[5]Numbers represent examples of the present invention whereas letters represent comparative experiments.

EXAMPLE 2

A. An advanced resin was prepared by reacting 738.3 g (3.97 epoxide equivalents) of Aromatic Diepoxide A, 184.6 g (1.0 epoxide equivalent) of Aliphatic Diepoxide D and 477.1 g (4.18 phenolic OH equivalents) of bisphenol A in the presence of 4.71 grams of a 47% solution of ethyltriphenyl phosphonium phosphate. The mixture was heated to 180° C. for 3 hours (10,800 s). The molten product was poured onto aluminum foil. Upon cooling the solid resin which had an epoxide equivalent weight of 1690 was readily broken into solid chunks which even after a year had not sintered.

B. In a similar manner, a resin was prepared from 458.0 g (2.54 epoxide equivalents) of Aromatic Diepoxide B, 458.0 g (2.49 epoxide equivalents) of Aliphatic Diepoxide D, and 484.0 (4.246 OH equivalents) of bisphenol A. The resultant solid resin had an epoxide equivalent weight of 1960. After several weeks of standing at room temperature the chunks of resin had fused together in a single mass showing the tendency of resins containing about 50% of the aliphatic diepoxides to sinter at room temperature.

EXAMPLE 3

Using the method of Example 1A, advanced epoxy resins having epoxide equivalent weights of about 3800 were prepared in which 25% (Resin A) and 40% (Resin B) of Aromatic Epoxide A were replaced by Aliphatic Epoxide C. These resins are compared to D.E.R. ™ 669, a solid diglycidyl ether of bisphenol A commercially available from The Dow Chemical Company. The epoxy to phenolic hydroxyl ratio was about 1.09:1. These results are shown in Table II.

TABLE II

| RESIN TYPE | % ALIPHATIC EPOXIDE | EPOXIDE EQUIVALENT WEIGHT | VISCOSITY (40% SOLIDS IN DOWANOL ™ DB) | METTLER SOFTENING (°C.) | MELT VISCOSITY @ 200° C. |
|---|---|---|---|---|---|
| D.E.R. ™ 669 | 0 | 2500–4000 | Z2–Z5 | 142–160 | 22000–70000 |
| Resin A | 25 | 3860 | Z | 122 | 8000 |
| Resin B | 40 | 3750 | U–V | 101.5 | 1725 |

This experiment demonstrates that greatly reduced solution viscosity and melt viscosity (improved flow) is imparted by incorporation of the aliphatic diepoxide.

EXAMPLE 4

Following the method of Example 1A, advanced epoxy resins having epoxide equivalent weights of about 1720 were prepared in which varying proportions of Aromatic Epoxide B were replaced by aliphatic epoxide A and the mixture advanced with bisphenol A. The physical properties of these resins are shown in Table III.

TABLE III

| SAMPLE | % OF ALIPHATIC EPOXIDE WT. % | % OF ALIPHATIC EPOXIDE EQUIV. % | KINEMATIC VISCOSITY @ 150° C.; cs. | METTLER SOFTENING POINT, °C. |
|---|---|---|---|---|
| A[a] | 0 | 0 | 42,400 | 123.8 |
| B[b] | 10 | 6.2 | 32,830 | 119.5 |
| C[c] | 20 | 12.4 | 15,620 | 105.7 |
| D[d] | 25 | 15.5 | 15,220 | 101.8 |

[a] Ratio of epoxy equivalents to phenolic hydroxyl equivalents was 1.18:1.
[b] Ratio of epoxy equivalents to phenolic hydroxyl equivalents was 1.14:1.
[c] Ratio of epoxy equivalents to phenolic hydroxyl equivalents was 1.18:1.
[d] Ratio of epoxy equivalents to phenolic hydroxyl equivalents was 1.18:1.

EXAMPLE 5

Following the method of Example 1A, advanced epoxy resins having epoxide equivalent weights of about 950 were prepared in which varying proportions of aromatic Epoxide B were replaced by aliphatic epoxide D and the mixture advanced with bisphenol A. The physical properties of these resins are shown in Table IV.

TABLE IV

| SAMPLE | % OF ALIPHPATIC EPOXIDE WT. % | % OF ALIPHPATIC EPOXIDE EQUIV. %[a] | EEW | KINEMATIC VISCOSITY @ 150° C.; cs. | METTLER SOFTENING POINT, °C. |
|---|---|---|---|---|---|
| A[b] | 0 | 0 | 934 | 7696 | 107.7 |
| B[c] | 5 | 5 | 957 | 6929 | 104.9 |
| C[d] | 10 | 10 | 953 | 4468 | 96.6 |
| D[e] | 20 | 20 | 971 | 3063 | 90.4 |
| E[f] | 30 | 30 | 975 | 1803 | 81.4 |

[a] Since the equivalent weight of aliphatic epoxide D is virtually identical to aromatic epoxide B, weight and equivalent percent are essentially identical.
[b] Ratio of epoxy equivalents to phenolic hydroxyl equivalents was 1.38:1.
[c] Ratio of epoxy equivalents to phenolic hydroxyl equivalents was 1.38:1
[d] Ratio of epoxy equivalents to phenolic hydroxyl equivalents was 1.38:1
[e] Ratio of epoxy equivalents to phenolic hydroxyl equivalents was 1.38_:1.
[f] Ratio of epoxy equivalents to phenolic hydroxyl equivalents was 1.39:1.

We claim:

1. An advanced epoxy resin prepared by reacting in the presence of a suitable catalyst
(A) a composition comprising
  (1) at least one aliphatic diepoxide other than a diglyoidyl ether of a polyoxyethylene glycol and
  (2) at least one aromatic diepoxide; with
(B) at least one compound having two aromatic hydroxyl groups per molecule and an average molecular weight of at least about 188;
wherein components (A-1) and (A-2) are employed in quantities such that from about 10 to less than 50 percent of the epoxide equivalents contained in component (A) are contributed by component (A-1); from greater than 50 to about 90 percent of such epoxide equivalents are contributed by component (A-2) and wherein components (A) and (B) are present in a quantity which provides an epoxy to phenolic hydroxyl ratio of from about 1.06:1 to about 2.9:1.

2. An advanced epoxy resin of claim 1 wherein components (A) and (B) are employed in quantities which provide an epoxy to phenolic hydroxyl ratio of from about 1.07:1 to about 2.9:1.

3. An epoxy resin of claim 2 wherein components (A) and (B) are employed in quantities which provide an epoxy to phenolic hydroxyl ratio of from about 1.15 to about 2.9:1.

4. A composition of claim 1, 2 or 3 wherein
(a) component (A-1) is a diglycidyl ether of a polyoxypropylene glycol or dipropylene glycol;
(b) component (A-2) is a diglycidyl ether of a bisphenol and
(c) component (B) is a bisphenol.

5. A composition of claim 4 wherein
(a) component (A-1) has an average epoxide equivalent weight of from about 123 to about 400 and
(b) component (A-2) is a diglycidyl ether of bisphenol A having an average epoxide equivalent weight of from about 172 to about 250; and
(c) component (B) is bisphenol A.

6. A composition of claim 4 wherein component (A-1) and (A-2) are employed in quantities such that from about 10 to about 40 percent of the epoxide equivalents contained in component (A) are contributed by component (A-1) and from about 60 to about 90 percent of the epoxide equivalents contained in component (A) are contributed by component (A-2).

7. A composition of claim 4 wherein component (A-1) and (A-2) are employed in quantities such that from about 10 to about 30 percent of the epoxide equivalents contained in component (A) are contributed by component (A-1) and from about 70 to about 90 percent of the epoxide equivalents contained in component (A) are contributed by component (A-2).

8. An advanced epoxy resin prepared by reacting in the presence of a suitable catalyst
(A) a composition comprising
  (1) at least one aliphatic diepoxide other than a diglycidyl ether of a polyoxyethylene glycol and
  (2) at least one aromatic diepoxide: with
(B) at least one compound having two aromatic hydroxyl groups per molecule and an average molecular weight of at least about 188;
wherein components (A-1) and (A-2) are employed in quantities such that from about 10 to less than 50 percent of the epoxide equivalents contained in component (A) are contributed by component (A-1); from greater than 50 to about 90 percent of such epoxide equivalents are contributed by component (A-2) and wherein components (A) and (B) are present in a quantity which results in an advanced epoxy resin having an average epoxide equivalent weight of from 350 to about 3000.

9. An advanced epoxy resin of claim 8 wherein components (A-1) and (A-2) are employed in quantities such that from about 10 to about 40 percent of the epoxide equivalents contained in component (A) are contributed by component (A-1); from about 60 to about 90 percent of such epoxide equivalents are contributed by component (A-2).

10. An advanced epoxy resin of claim 9 wherein components (A) and (B) are present in a quantity which results in an advanced epoxy resin having an average epoxide equivalent weight of from 1400 to about 3000.

11. An advanced epoxy resin of claim 8 wherein components (A-1) and (A-2) are employed in quantities such that from about 10 to about 30 percent of the epoxide equivalents contained in component (A) are contributed by component (A-1); from about 70 to about 90 percent of such epoxide equivalents are contributed by component (A-2).

12. An advanced epoxy resin of claim 11 wherein components (A) and (B) are present in a quantity which results in an advanced epoxy resin having an average epoxide equivalent weight of from 1400 to about 3000.

13. An advanced epoxy resin composition of claim 8, 9, 10, 11 or 12 wherein
(a) component (A-1) is a diglycidyl ether of a polyoxypropylene glycol or dipropylene glycol;

(b) component (A-2) is a diglycidyl ether of a bisphenol; and
(c) component (B) is a bisphenol.

14. An advanced epoxy resin composition of claim 13 wherein
    (a) component (A-1) has an average epoxide equivalent weight of from about 123 to about 400;
    (b) component (A-2) is a diglycidyl ether of bisphenol A having an epoxide equivalent weight of from about 172 to about 250; and
    (c) component (B) is bisphenol A.

15. A coating composition comprising
    (I) an advanced epoxy resin composition of claim 1, 2, 3, 8, 9, 10, 11 or 12;
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

16. A coating composition comprising
    (I) an advanced epoxy resin composition of claim 4:
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof; and
    (III) at least one solvent in a sufficient quantity such that the coating composition including components (I), (II), (III) and any other desirable component has a suitable application viscosity.

17. A coating composition comprising
    (I) an advanced epoxy resin composition of claim 5;
    (II) a curing quantity of at least one curing agent for component (1) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

18. A coating composition comprising
    (I) an advanced epoxy resin composition of claim 6;
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

19. A coating composition comprising
    (I) an advanced epoxy resin composition of claim 7;
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

20. A coating composition comprising
    (I) an advanced epoxy resin composition of claim 13;
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

21. A coating composition comprising
    (I) an advanced epoxy resin composition of claim 14;
    (II) a curing quantity of at least one curing agent for component (I) selected from melamine-formaldehyde resins, urea-formaldehyde resins, totally or partially etherified melamine-formaldehyde resins, partially or totally etherified urea-formaldehyde resins or a combination thereof: and
    (III) at least one solvent in a sufficient quantity such that the coating composition including components (I), (II), (III) and any other desirable component has a suitable application viscosity.

22. A powder coating composition comprising
    (I) an advanced epoxy resin of claim 1, 2, 3, 8, 9, 10, 11 or 12; and
    (II) a curing quantity of at least one curing agent for component (I).

23. A powder coating composition of claim 22 wherein said curing agent is cyanoguanidine, a phenolic terminated resin, a carboxylic acid anhydride or a carboxyl-containing polyester.

24. A powder coating composition comprising
    (I) an advanced epoxy resin of claim 4; and
    (II) a curing quantity of at least one curing agent for component (I).

25. A powder coating composition of claim 24 wherein said curing agent is a cyanoguanidine, a phenolic terminated resin, a carboxylic acid anhydride or a carboxyl-containing polyester.

26. A powder coating composition comprising
    (I) an advanced epoxy resin of claim 5: and
    (II) a curing quantity of at least one curing agent for component (I).

27. A powder coating composition of claim 26 wherein said curing agent is a cyanoguanidine, a phenolic terminated resin, a carboxylic acid anhydride or a carboxyl-containing polyester.

28. A powder coating composition comprising
    (I) an advanced epoxy resin of claim 6: and
    (II) a curing quantity of at least one curing agent for component (I).

29. A powder coating composition of claim 28 wherein said curing agent is a cyanoguanidine, a phenolic terminated resin, a carboxylic acid anhydride or a carboxyl-containing polyester.

30. A powder coating composition comprising
    (I) an advanced epoxy resin of claim 7; and
    (II) a curing quantity of at least one curing agent for component (I).

31. A powder coating composition of claim 30 wherein said curing agent is a cyanoguanidine, a phenolic terminated resin, a carboxylic acid anhydride or a carboxyl-containing polyester.

32. A powder coating composition comprising
(I) an advanced epoxy resin of claim 13; and
(II) a curing quantity of at least one curing agent for component (I).

33. A powder coating composition of claim 32 wherein said curing agent is a cyanoguanidine, a phenolic terminated resin, a carboxylic acid anhydride or a carboxyl-containing polyester.

34. A powder coating composition comprising
(I) an advanced epoxy resin of claim 14: and
(II) a curing quantity of at least one curing agent for component (I).

35. A powder coating composition of claim 34 wherein said curing agent is a cyanoguanidine, a phenolic terminated resin, a carboxylic acid anhydride or a carboxyl-containing polyester.

36. An advanced epoxy resin prepared by reacting in the presence of a suitable catalyst
(A) a composition comprising
  (1) at least one aliphatic diepoxide other than a diglycidyl ether of a polyoxyethylene glycol and
  (2) at least one aromatic diepoxide; with
(B) at least one compound having two aromatic hydroxyl groups per molecule and an average molecular weight of at least about 188; wherein
components (A-1) and (A-2) are employed in quantities such that from about 6 to about 30 percent of the epoxide equivalents contained in component (A) are contributed by component (A-1) from about 70 to about 94 percent of such epoxide equivalents are contributed by component (A-2) and wherein components (A) and (B) are employed in quantities which provide the resultant advanced epoxy resin with an epoxide equivalent weight of from about 800 to about 3500.

37. An advanced epoxy resin of claim 36 wherein components (A) and (B) are employed in quantities which provide the resultant advanced epoxy resin with an epoxide equivalent weight of from about 800 to about 2000.

38. A composition of claim 36 or 37 wherein
(a) component (A-1) is a diglycidyl ether of a polyoxypropylene glycol or dipropylene glycol;
(b) component (A-2) is a diglycidyl ether of a bisphenol and
(c) component (B) is a bisphenol.

39. A composition of claim 38 wherein
(a) component (A-1) has an average epoxide equivalent weight of from about 123 to about 400 and
(b) component (A-2) is a diglycidyl ether of bisphenol A having an average epoxide equivalent weight of from about 172 to about 250; and
(c) component (B) is bisphenol A.

40. A powder coating composition comprising
(I) an advanced epoxy resin of claim 36 or 37; and
(II) a curing quantity of at least one curing agent for component (I).

41. A powder coating composition of claim 40 wherein said curing agent is a cyanoguanidine, a phenolic terminated resin, a carboxylic acid anhydride or a carboxyl-containing polyester.

42. A powder coating composition comprising
(I) an advanced epoxy resin of claim 38, and
(II) a curing quantity of at least one curing agent for component (I).

43. A powder coating composition of claim 42 wherein said curing agent is a cyanoguanidine, a phenolic terminated resin, a carboxylic acid anhydride or a carboxyl-containing polyester.

44. A powder coating composition comprising
(I) an advanced epoxy resin of claim 39; and
(II) a curing quantity of at least one curing agent for component (I).

45. A powder coating composition of claim 44 wherein said curing agent is a cyanoguanidine, a phenolic terminated resin, a carboxylic acid anhydride or a carboxyl-containing polyester.

* * * * *